United States Patent
Ho et al.

(10) Patent No.: US 12,323,805 B2
(45) Date of Patent: Jun. 3, 2025

(54) DETECTING SYSTEM AND DETECTING METHOD FOR UNAUTHORIZED DEVICE

(71) Applicant: DELTA ELECTRONICS, INC., Taoyuan (TW)

(72) Inventors: Ting-Wu Ho, Taoyuan (TW); Chun-Yi Chen, Taoyuan (TW); Feng-Jie Tsai, Taoyuan (TW); Chia-Lung Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 231 days.

(21) Appl. No.: 18/207,133

(22) Filed: Jun. 7, 2023

(65) Prior Publication Data

US 2024/0305989 A1  Sep. 12, 2024

(30) Foreign Application Priority Data

Mar. 10, 2023 (CN) .......................... 202310230274.9

(51) Int. Cl.
*H04W 12/121* (2021.01)
*G01S 5/02* (2010.01)
*H04W 12/63* (2021.01)

(52) U.S. Cl.
CPC ......... *H04W 12/121* (2021.01); *G01S 5/0268* (2013.01); *H04W 12/63* (2021.01)

(58) Field of Classification Search
CPC . H04W 12/121; H04W 12/63; H04W 12/122; H04W 64/00; G01S 5/0268; G01S 5/0249
See application file for complete search history.

(56) References Cited

U.S. PATENT DOCUMENTS

| 10,667,235 | B1 * | 5/2020 | Yellin | ................... | H04W 64/00 |
| 2015/0215892 | A1 * | 7/2015 | Teng | ................... | G01S 5/0226 |
| | | | | | 455/456.1 |

(Continued)

FOREIGN PATENT DOCUMENTS

TW  201037343 A  10/2010

OTHER PUBLICATIONS

P. Davidson and R. Piche, "A Survey of Selected Indoor Positioning Methods for Smartphones," in IEEE Communications Surveys & Tutorials, vol. 19, No. 2, pp. 1347-1370, Secondquarter 2017, doi: 10.1109/COMST.2016.2637663. (Year: 2017).*

(Continued)

*Primary Examiner* — Robert B Leung
(74) *Attorney, Agent, or Firm* — Chun-Ming Shih; HDLS IPR SERVICES

(57) ABSTRACT

A detecting system for an unauthorized device having a movable locator is disclosed. The movable locator includes a location positioning unit, a signal sniffing unit, a signal collecting unit, and a device positioning unit. The location positioning unit detects a locator position of the movable locator. The signal sniffing unit detects Wi-Fi signal of an unauthorized device and generates a sensing report message. The signal collecting unit adds multiple sensing report messages to a sensing report record collection. The device positioning unit organizes multiple positioning combinations based on the content of the sensing report record collection, generates multiple positioning results respectively based on the multiple positioning combinations, and performs a weighting process to the multiple positioning results to generate a final positioning result of the unauthorized device.

14 Claims, 11 Drawing Sheets

(56) References Cited

U.S. PATENT DOCUMENTS

| | | | | |
|---|---|---|---|---|
| 2017/0006436 | A1* | 1/2017 | Ahmed | H04W 4/33 |
| 2017/0171714 | A1* | 6/2017 | Cai | G01S 5/0036 |
| 2020/0068351 | A1* | 2/2020 | Galvez | H04W 4/33 |
| 2021/0141049 | A1 | 5/2021 | Nurminen et al. | |
| 2022/0053283 | A1 | 2/2022 | Beaurepaire et al. | |
| 2022/0326371 | A1* | 10/2022 | Dwivedi | G01S 5/0249 |
| 2023/0083426 | A1* | 3/2023 | Szigeti | G07C 9/00309 |
| | | | | 340/5.2 |
| 2023/0362650 | A1* | 11/2023 | Koral | H04W 12/122 |

OTHER PUBLICATIONS

C. Yang and H.-r. Shao, "WiFi-based indoor positioning," in IEEE Communications Magazine, vol. 53, No. 3, pp. 150-157, Mar. 2015, doi: 10.1109/MCOM.2015.7060497. (Year: 2015).*

Manikanta Kotaru et al, "SpotFi: Decimeter Level Localization Using WiFi", Stanford University ACM SIGCOMM, vol. 45, Issue 4. pp. 269-282. Aug. 17, 2015.

Deepak Vasisht et al, "Decimeter-Level Localization with a Single WiFi Access Point", Proceedings of the 13th USENIX Symposium on Networked Systems Design and Implementation (NSDI '16), Mar. 16-18, 2016, ISBN 978-1-931971-29-4, https://www.usenix.org/conference/nsdi16/technical-sessions/presentation/vasisht.

Office Action dated Sep. 5, 2024 of the corresponding Taiwan patent application No. 112108872.

* cited by examiner

DETECTING SYSTEM AND DETECTING METHOD FOR UNAUTHORIZED DEVICE

TECHNICAL FIELD

The disclosure relates to a detecting system and a detecting method, and particularly to a detecting system and a detecting method for an unauthorized device.

DESCRIPTION OF RELATED ART

In offices or factories of high-tech industry, employees are forbidden in using unauthorized electrical devices such as cellphones or tablets, etc. in order to protect the company's highly technical secrets.

The current approaches of detecting unauthorized devices in the offices or factories includes using Wi-Fi access point (AP) device to detect the signal of the unauthorized devices and inspecting the unauthorized devices by using sniffers additionally arranged in the factories. However, detecting using Wi-Fi AP devices encounter poor positioning accuracy and easily have signal dead spots; deploying sniffers in the factory environment need additional arrangement cost.

SUMMARY OF THE DISCLOSURE

The present disclosure is directed to a detecting system and a detecting method of an unauthorized device, which use movable locator to detect the unauthorized device in order to position the unauthorized device.

In one of the exemplary embodiments, the detecting system for an unauthorized device of the present disclosure includes a movable locator, and the movable locator includes:
 a location positioning unit configured to position the movable locator to obtain a locator position;
 a signal sniffing unit configured to generate a sensing report message when sensing a broadcast Wi-Fi signal of an unauthorized device, wherein the sensing report message includes a device ID of the unauthorized device, a signal information of the broadcast Wi-Fi signal, and the locator position when the broadcast Wi-Fi signal is detected;
 a signal collecting unit configured to regard the sensing report message as a sensing report data to collect to a sensing report record collection, wherein the sensing report data records the device ID, the signal information, and the locator position; and
 a device positioning unit configured to retrieve multiple of the sensing report data corresponding to the device ID from the sensing report record collection, organize multiple positioning combinations from the multiple of sensing report data based on positioning condition, execute a positioning procedure in accordance with the multiple positioning combinations to generate multiple positioning results, and perform a weighting process to the multiple positioning results to generate a final positioning result of the unauthorized device.

In one of the exemplary embodiments, the detecting system of an unauthorized device of the present disclosure includes:
 a master locator configured to move along a first patrol route and generate a first sensing report message when sensing a broadcast Wi-Fi signal of an unauthorized device, wherein the first sensing report message at least includes a device ID of the unauthorized device, a signal information of the broadcast Wi-Fi signal, and a master locator position when the broadcast Wi-Fi signal is detected; and
 a slave locator configured to move along a second patrol route which is different from the first patrol route, generate a second sensing report message when sensing the broadcast Wi-Fi signal of the unauthorized device, and wirelessly transmit the second report message to the master locator, wherein the second sensing report message at least includes the device ID of the unauthorized device, the signal information of the broadcast Wi-Fi signal, and a slave locator position when the broadcast Wi-Fi signal is detected;
 wherein the master locator includes:
 a signal collecting unit configured to regard multiple of the first sensing report message and multiple of the second sensing report message as multiple sensing report data to add to a sensing report record collection, wherein each of the sensing report data respectively records the device ID, the signal information, and the master locator position or the slave locator position; and
 a device positioning unit configured to retrieve the multiple sensing report data corresponding to the device ID from the sensing report record collection, organize multiple positioning combinations from the multiple sensing report data based on a positioning condition, execute a positioning procedure respectively in accordance with the multiple positioning combinations to generate multiple positioning results, and perform a weighting process to the multiple positioning results to generate a final positioning result of the unauthorized device.

In one of the exemplary embodiments, the detecting method of an unauthorized device of the present disclosure is applied for the movable locator as disclosed above and includes the following steps:
 a) moving along a patrol route by the movable locator to continuously obtain the locator position;
 b) generating the sensing report message by the movable locator when sensing the broadcast Wi-Fi signal of the unauthorized device, wherein the sensing report message at least includes the device ID of the unauthorized device, the signal information of the broadcast Wi-Fi signal, and the locator position when the broadcast Wi-Fi signal is detected;
 c) regarding the multiple sensing report messages as multiple sensing report data by the movable locator to add to the sensing report record collection, wherein each of the sensing report data respectively records the device ID, the signal information, and the locator position;
 d) retrieving multiple sensing report data corresponding to the device ID from the sensing report record collection by the movable locator and organizing multiple positioning combinations from the multiple sensing report data based on the positioning condition;
 e) executing the positioning procedure by the movable locator to respectively generate multiple positioning results in accordance with the multiple positioning combinations;
 f) performing the weight process to the multiple positioning results by the movable locator to generate the final positioning result of the unauthorized device.

In comparison with related arts, the present disclosure uses a movable locator to detect and position the unauthorized device, the using of the movable locator doesn't need for construction on the environment, which may achieve the technical effects of low cost, high mobility, and convenient usage.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure provides a detecting system of an unauthorized device (referred to as the detecting system in the following), which is used to detect whether an unauthorized device exists in a specific environment (such as an office or a factory) and the position of the unauthorized device. The present disclosure helps the manager of the office or the factory to discover and exclude the unauthorized device in the environment to avoid the confidential information from being leaked.

Figure 1:
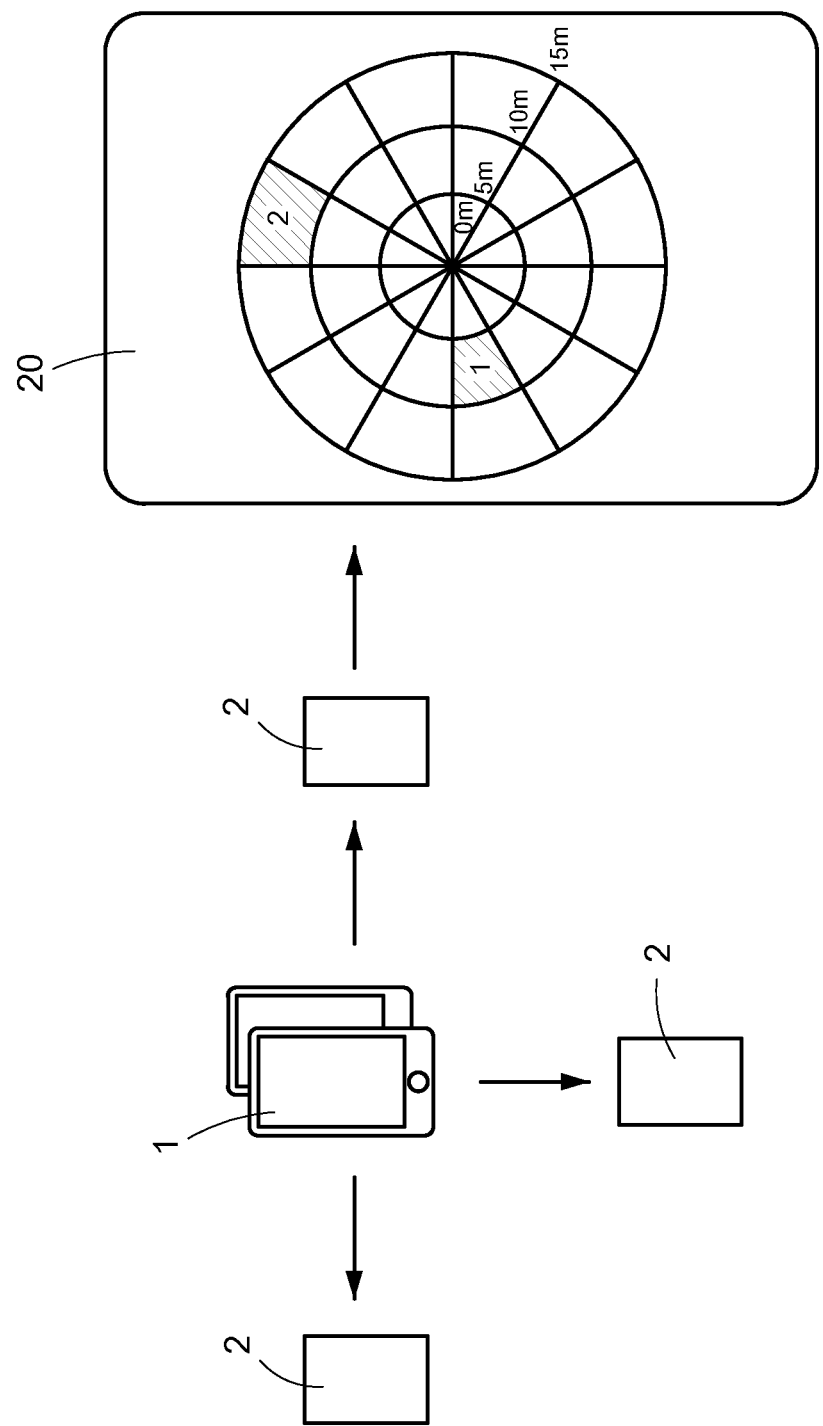
FIG. 1 is a schematic diagram of a detecting system of one embodiment according to the present disclosure.

Please refer to FIG. 1, which is a schematic diagram of a detecting system of one embodiment according to the present disclosure. As shown in FIG. 1, the detecting system of the present disclosure includes one or more movable locators 2. The one or more movable locators 2 move within the environment and continuously detect the signal of the unauthorized device(s) 1 (e.g., electronic devices capable of network connection and computation such as smart phones, smart watches, and tablets).

In one embodiment, the one or more movable locators 2 at least include one master locator, and include zero, one, or more than one slave locators. The master locator may position the unauthorized device 1 in accordance with external signal being sensed to obtain the specific position (such as the coordinates information) of the unauthorized device 1 existing in the environment and display the position of the unauthorized device 1 on its displaying monitor 20. By referencing to the positioning result displayed on the master locator, the manager may easily find the position of the unauthorized device 1 to exclude the same. In the embodiment shown in FIG. 1, two unauthorized devices 1 exist in the environment. After the positioning is completed, the master locator may respectively or simultaneously display the positions of the two unauthorized devices 1 in the environment on its displaying monitor 20.

Figure 2:
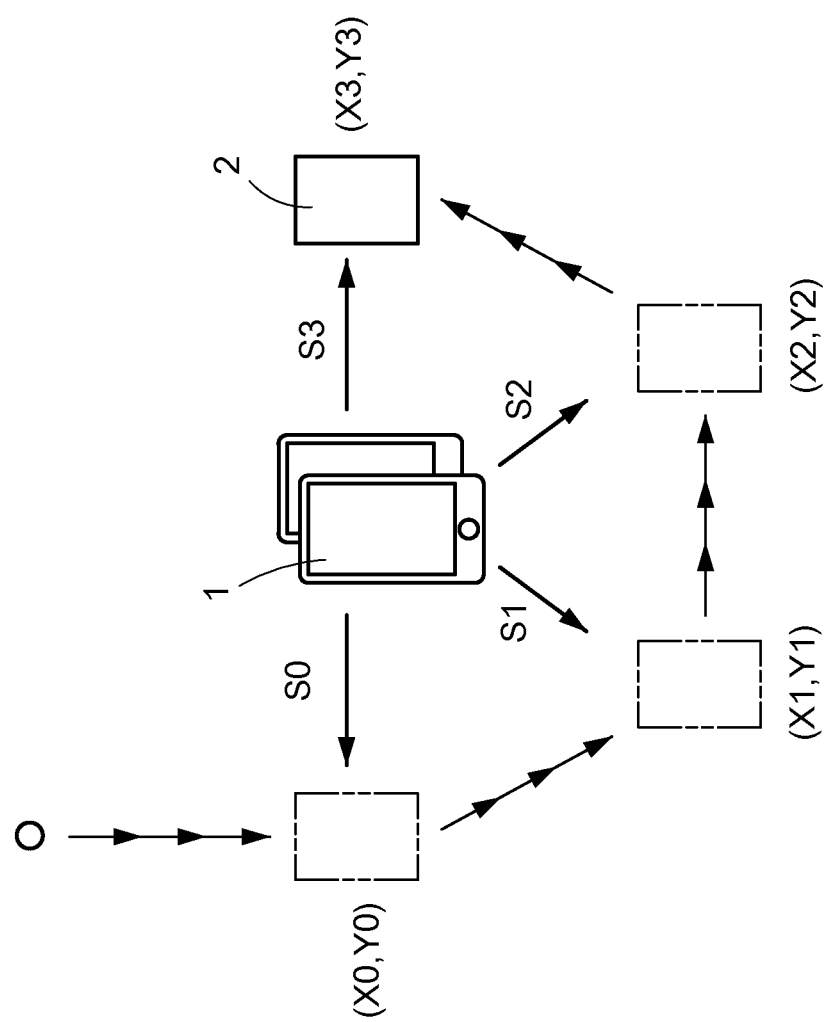
FIG. 2 is a schematic diagram showing the movement of a movable locator of one embodiment according to the present disclosure.

Please refer to both FIG. 1 and FIG. 2, wherein FIG. 2 is a schematic diagram showing the movement of a movable locator of one embodiment according to the present disclosure. As shown in FIG. 2, the detecting system of the present disclosure is unnecessary to be deployed in advance. The movable locator 2 may be carried by man or machine in charge of patrol to move within the environment and continuously sense the signal of the unauthorized device 1 during its movement.

In particularly, when moving to a place that is close enough to the unauthorized device 1, the movable locator 2 may sense the broadcast Wi-Fi signal sent from the unauthorized device 1. In the present disclosure, the movable locator 2 records the signal information of the broadcast Wi-Fi signal being sensed. When the amount of the broadcast Wi-Fi signal being recorded reaches a satisfied amount, the movable locator 2 may position the unauthorized device 1 via using the recorded signal information of these broadcast Wi-Fi signal. In one embodiment, the signal information may be, for example but not limited to, signal strength or channel state information of the broadcast Wi-Fi signal.

In the embodiment of FIG. 2, the movable locator 2 moves to position 0 (with coordinates $X_0$ and $Y_0$) at time point T0 and senses broadcast Wi-Fi signal S0 (having signal information 0) sent from the unauthorized device 1, moves to position 1 (with coordinates $X_1$ and $Y_1$) at time point T1 and senses broadcast Wi-Fi signal S1 (having signal information 1) sent by the unauthorized device 1, moves to position 2 (with coordinates $X_2$ and $Y_2$) at time point T2 and senses broadcast Wi-Fi signal S2 (having signal information 2) sent from the unauthorized device 1, and moves to position 3 (with coordinates $X_3$ and $Y_3$) at time point T3 and senses broadcast Wi-Fi signal S3 (having signal information 3) sent by the unauthorized device 1. By collecting and analyzing these position information and signal information, the movable locator 2 may position the current location of the unauthorized device 1.

Figure 3:
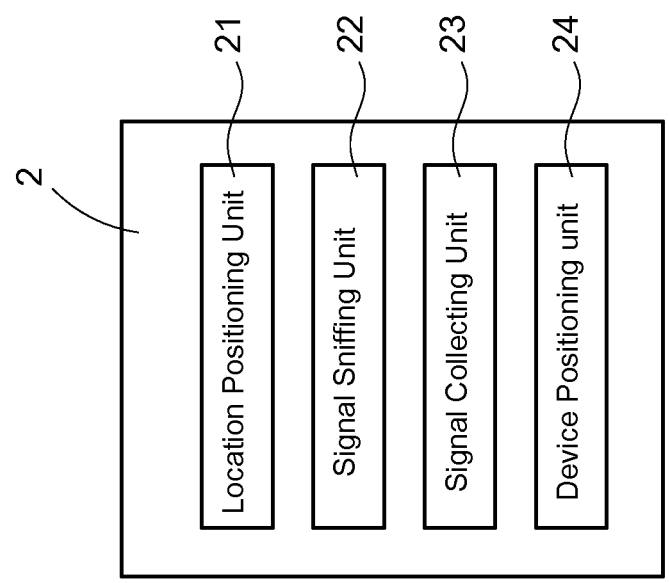
FIG. 3 is a block diagram of a movable locator of one embodiment according to the present disclosure.

Please refer to FIG. 1 through FIG. 3 at the same time, wherein FIG. 3 is a block diagram of a movable locator of one embodiment according to the present disclosure. As shown in FIG. 3, the movable locator 2 of the present disclosure includes a location positioning unit 21, a signal sniffing unit 22, a signal collecting unit 23, and a device positioning unit 24.

In one embodiment, the units 21 to 24 may be implemented by different hardware components in the movable locator 2; in other words, the units 21 to 24 are hardware units. In another embodiment, the movable locator 2 includes a processor (not shown in the FIG.) and the processor records computer-executable program code. After the processor executes the computer-executable program code, different parts of the program code (such as different subroutines) construct the units 21 to 24 virtually in the movable locator 2 to respectively implement the necessary functions. That is, the units 21 to 24 may be software units. However, the units 21 to 24 may be implemented by both hardware and software in the movable locator 2, it is not limited to only the disclosure of the above embodiment.

The location positioning unit 21 is used to position the movable locator 2 itself to obtain a locator position in accordance with the positioning result. The locator position may be the coordinate location of the movable locator 21, and the coordinate location may include an X-axis coordinate and a Y-axis coordinate within a two-dimensional space or an X-axis coordinate, a Y-axis coordinate, and a Z-axis coordinate within a three-dimensional space.

In one embodiment, the movable locator 2 moves from a starting point along a patrol route. In one embodiment, the location positioning unit 21 periodically executes a positioning procedure (for example, every second or every five seconds) during the movable locator 2 moves, so as to continuously obtain the locator position. In other embodiment, the patrol route is pre-set to include multiple stopping points (also called checkpoints), and the location positioning unit 21 executes the positioning procedure whenever the movable locator 2 reaches each of the stopping points to continuously trace the locator position.

In one embodiment, the location positioning unit 21 positions the movable locator 2 through an inertial positioning technology, but not limited thereto. In other embodiment, the location positioning unit 21 may be a GPS unit that positions the movable locator 2 through GPS signals.

The signal sniffing unit 22 is a wireless signal sniffing unit used to detect external signal. In one embodiment, the external signal may be Wi-Fi signal. When the movable locator 2 keeps moving and close enough to the unauthorized device 1, the signal sniffing unit 22 may detect the broadcast Wi-Fi signal of the unauthorized device 1, wherein the signal strength of the broadcast Wi-Fi signal is inversely proportional to the actual distance between the movable locator 2 and the unauthorized device 1. Besides, the channel state information of the broadcast Wi-Fi signal may be used to infer the signal flight time between the movable locator 2 and the unauthorized device 1 and is proportional to the actual distance between the movable locator 2 and the unauthorized device 1.

In the present disclosure, when the broadcast Wi-Fi signal is detected, the signal sniffing unit 22 may obtain both the broadcast Wi-Fi signal and the device ID of the unauthorized device 1 who sends the broadcast Wi-Fi signal. In the meantime, the signal sniffing unit 22 generates a sensing report message (such as the sensing report message 41 shown in FIG. 4) correspondingly when the broadcast Wi-Fi signal is sensed by the signal sniffing unit 22.

Figure 4:
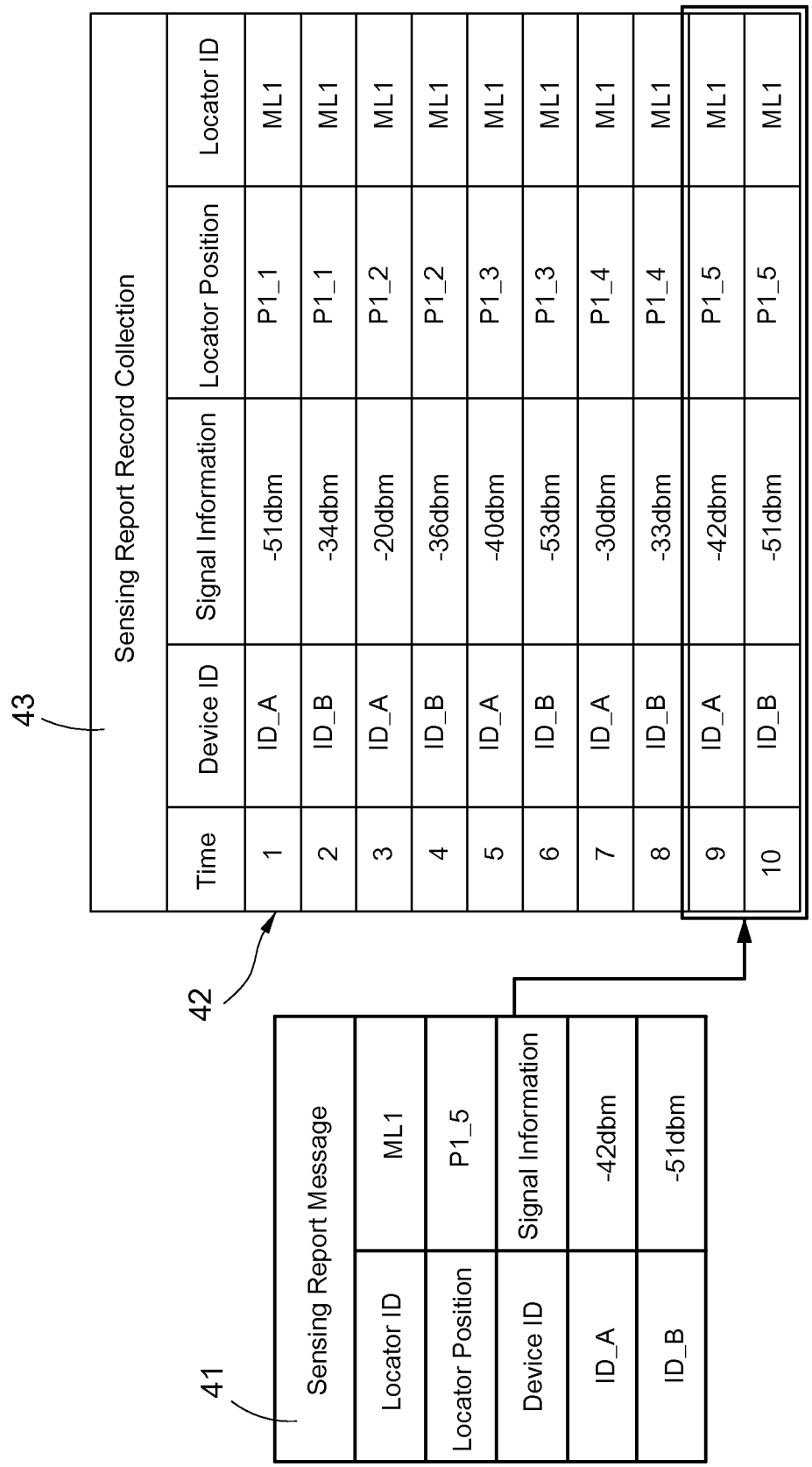
FIG. 4 is a schematic diagram of a sensing report record collection of one embodiment according to the present disclosure.

Please refer to FIG. 1 through FIG. 4 at the same time, wherein FIG. 4 is a schematic diagram of a sensing report record collection of one embodiment according to the present disclosure. As shown in FIG. 4, the sensing report message 41 at least includes the device ID of the unauthorized device 1 being sensed, the signal information of the broadcast Wi-Fi signal being sensed (exampled by the signal strength in FIG. 4, but may be the channel state information in other embodiments), and the locator position of the movable locator 2 when the broadcast Wi-Fi signal is detected (example by P1_5 in FIG. 4).

The movable locator 2 stores the sensing report record collection 43. The signal collecting unit 23, when a sensing report message 41 is newly generated, regards the sensing report message 41 as a new sensing report data 42 and adds the sensing report data 42 to the sensing report record collection 43. As shown in FIG. 4, the sensing report record collection 43 records multiple sensing report data 42 where each of the sensing report data 42 is generated based on one sensing report message 41 and includes every information piece of the sensing report message 41. In one embodiment, each of the sensing report data 42 respectively records the device ID of the unauthorized device 1 being detected, the signal information of the broadcast Wi-Fi signal being sensed, and the locator position of the movable locator 2 when the broadcast Wi-Fi signal is sensed.

In the embodiment of FIG. 4, the signal sniffing unit 22 of the movable locator 2 senses the broadcast Wi-Fi signal (with the signal strength of −42 dbm) of a first unauthorized device with one device ID (ID_A) and the broadcast Wi-Fi signal (with the signal strength of −51 dbm) of a second unauthorized device with another device ID (ID_B). In this scenario, the signal sniffing unit 22 generates the sensing report message 41 based on the two device IDs, the signal information (the signal strength for example) of the two broadcast Wi-Fi signal, and the locator position generated by the location positioning unit 21 (P1_5 for example). In one embodiment, the sensing report message 41 may also include a locator ID of the movable locator 2 (ML1 for example), but not limited thereto.

In the above embodiment, the sensing report message 41 includes the information of two unauthorized devices, so the signal collecting unit 23 of the movable locator 2 generates two sensing report data 42 based on the content of the sensing report message 41 and adds the two sensing report data 42 to the sensing report record collection 43. In the present disclosure, the movable locator 2 positions the one or more unauthorized devices in accordance with the multiple sensing report data 42 in the sensing report record collection 43.

In the embodiment of FIG. 2 to FIG. 4, the detecting system includes only one movable locator 2 so that all the sensing report message 41 are generated by the signal sniffing unit 22 of the movable locator 2. When the detecting system includes only one movable locator 2, the movable locator 2 must be the master locator (in this case, it has zero slave locator).

In other embodiment, the detecting system may have multiple movable locators. When the detecting system has multiple movable locators, the multiple movable locators at least include one master locator and one or more slave locators. In this embodiment, both the master locator and the slave locator(s) can be used to sense the unauthorized device 1 and generate the sensing report message 41; however, the sensing report message 41 generated by the master locator and the sensing report message(s) 41 generated by the slave locator(s) are added by the master locator to the sensing report record collection 43 (detailed described in the following).

In the present disclosure, the device positioning unit 24 is triggered periodically or triggered through specific events. When being triggered, the device positioning unit 24 retrieves multiple sensing report data 42 corresponding to same device ID (such as ID_A) from the sensing report record collection 43. Next, the device positioning unit 24 organizes multiple positioning combinations from the multiple retrieved sensing report data 42 based on a pre-set positioning condition and executes the positioning procedure to generate multiple positioning results respectively according to the multiple positioning combinations. In one embodiment, the device positioning unit 24 may use an approach such as triangulation-like positioning technology to position the unauthorized device 1. To do so, each of the positioning combinations includes at least three sensing report data 42 (i.e., includes at least three signal information corresponding to same unauthorized device 1).

To improve the positioning accuracy, the device positioning unit 24 generates multiple positioning results based on the multiple positioning combinations, where each positioning result may have difference with the current location of the unauthorized device 1. In the present disclosure, the device positioning unit 24 further performs a weighting process to the multiple positioning results to generate a final positioning result for the unauthorized device 1. Besides, as disclosed in FIG. 1, the movable locator 2 may display the final positioning result (such as the coordinates) of the unauthorized device 1 on the displaying monitor 20 through text, figures, or the like for the manager to exclude the unauthorized device 1 existing in the environment.

Figure 5:
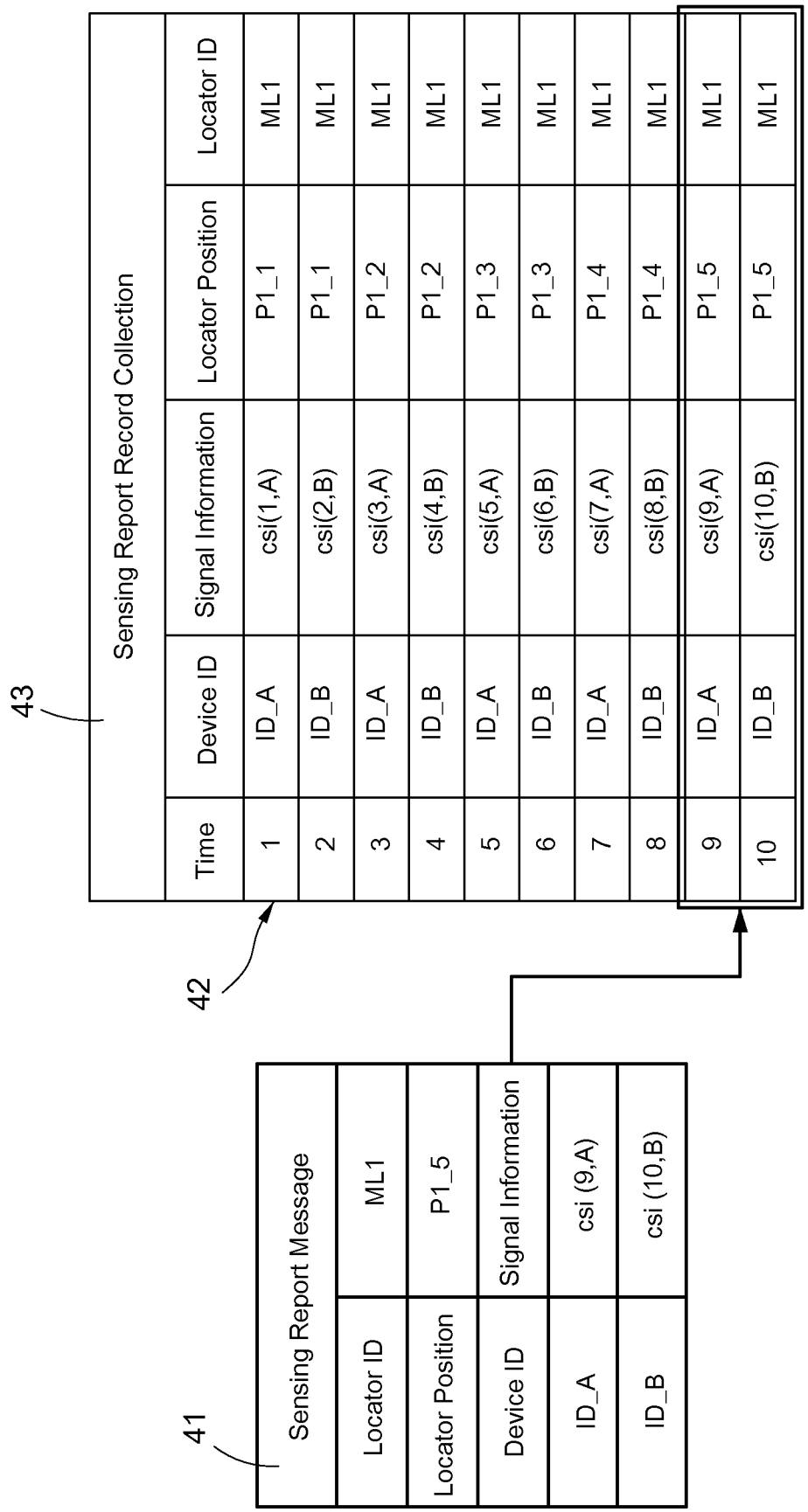
FIG. 5 is a schematic diagram of a sensing report record collection of one embodiment according to the present disclosure.

Please refer to FIG. 5, which is a schematic diagram of a sensing report record collection of one embodiment according to the present disclosure. The difference between FIG. 4 and FIG. 5 is that the signal information in FIG. 5 is the channel state information. The channel state information describes the transmission pair of each antenna and the channel state of each subcarrier. By obtaining and recording the channel state information, the movable locator 2 may calculate positioning-related information values such as the signal wave receiving incident angle or the signal wave flight time. As discussed, each positioning combination includes at least three sensing report data 42 (i.e., at least three signal information corresponding to same unauthorized device 1), the device positioning unit 24 may use the approach such as triangulation-like positioning technology based on the channel state information to position the unauthorized device 1.

Figure 6:
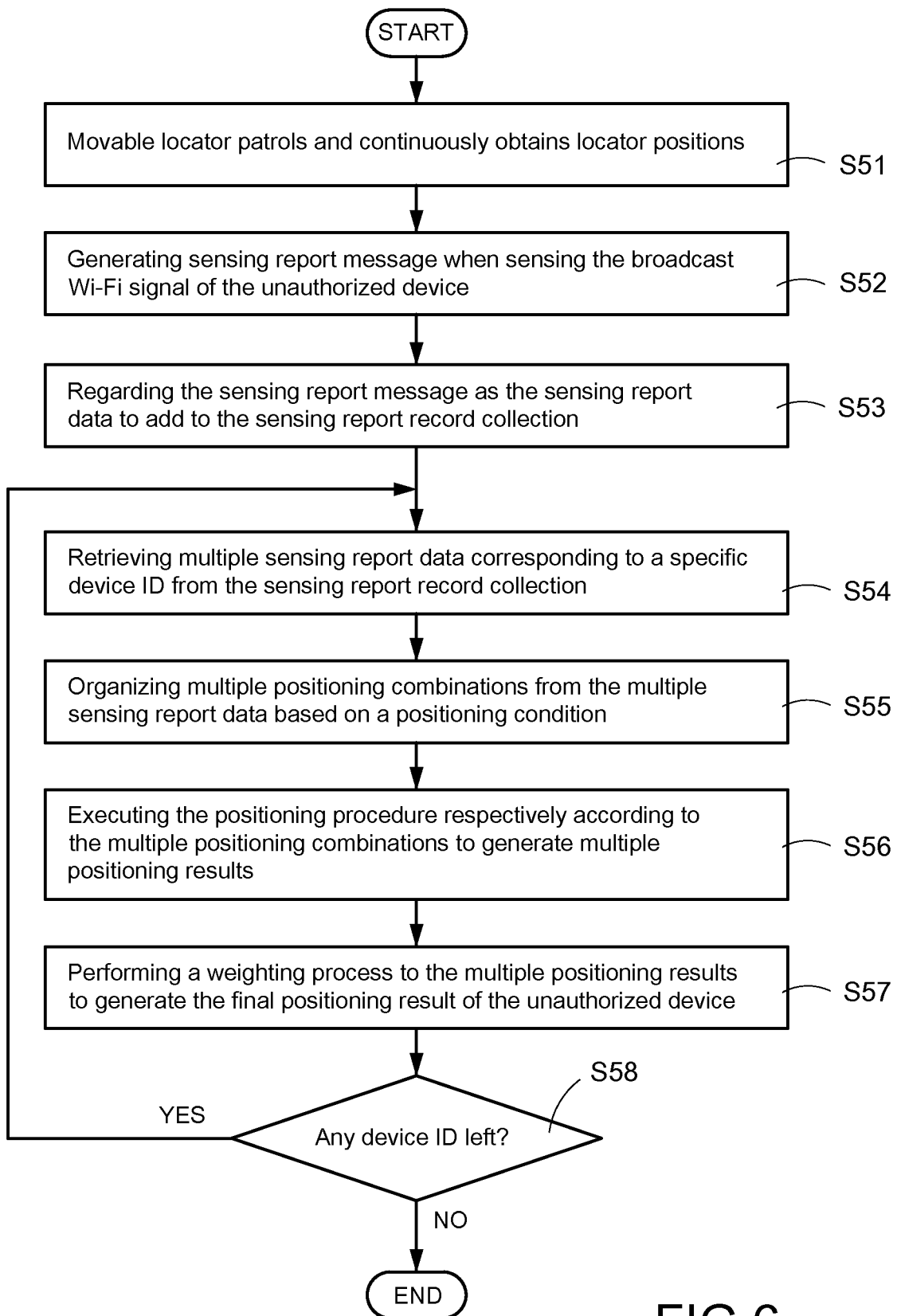
FIG. 6 is a flowchart of a detecting method of one embodiment according to the present disclosure.

Please refer to FIG. 6, which is a flowchart of a detecting method of one embodiment according to the present disclosure. FIG. 6 discloses a detecting method for an unauthorized device of the present disclosure (referred to as the detecting method in the following), the detecting method is applied for the movable locator(s) 2 as disclosed in FIG. 1 through FIG. 3. For the sake of understanding, one movable locator 2 is taken as an example to discuss the embodiment of FIG. 6; however, the amount of the movable locator 2 of the detecting system is not limited to one.

As shown in FIG. 6, one or multiple of men or machines in charge of patrol in the environment carries at least one movable locator 2 and moves within the environment along a pre-set patrol route. During the procedure, the movable locator 2 (either moving or staying) continuously positions itself to obtain multiple locator positions over time series (step S51).

In one embodiment, the movable locator 2 uses inertial positioning technology by the location positioning unit 21 to position itself to obtain the locator position, but not limited thereto.

The movable locator 2 continuously senses external signal through the signal sniffing unit 22 during its movement. In one embodiment, the movable locator 2 senses the Wi-Fi signal broadcasted by external devices, but not limited thereto.

When sensing the external broadcast Wi-Fi signal, the movable locator 2 automatically generates a sensing report message 41 correspondingly (step S52). In one embodiment, the movable locator 2 periodically performs the sensing action for the external signal and generates the sensing report message 41 correspondingly whenever the broadcast Wi-Fi signal is sensed. As discussed above, each sensing report message 41 includes the device ID of the unauthorized device 1 being sensed, the signal information of the broadcast Wi-Fi signal being sensed, and the locator position of the movable locator 2 when the broadcast Wi-Fi signal is sensed.

In another embodiment, the detecting system includes multiple movable locators 2. In the step S52, in addition to generate the sensing report message 41 of itself, the movable locator 2 also receives other sensing report message 41 transmitted from another movable locator 2 through wireless network. In the embodiment, the multiple movable locators 2 respectively move in the environment along different patrol routes and detect the unauthorized device 1. As a result, the accuracy of positioning the unauthorized device 1 may be improved.

In the present disclosure, after generating or receiving the sensing report message 41, the movable locator 2 regards the content of the sensing report message 41 as the sensing report data 42 to add to the sensing report record collection 43 (step S53). Therefore, the movable locator 2 may be triggered periodically to position the unauthorized device 1 based on the data in the sensing report record collection 43 or triggered by specific events to position the unauthorized device 1 based on the data in the sensing report record collection 43.

After being triggered, the movable locator 2 retrieves multiple sensing report data 42 that correspond to a specific device ID from the sensing report record collection 43 (step S54) and organizes multiple positioning combinations from the multiple sensing report data 42 based on a pre-set positioning condition (step S55). Next, the movable locator 2 executes the positioning procedure respectively according to the multiple positioning combinations to respectively generate multiple positioning results (step S56). Next, the movable locator 2 performs a weighting process to the multiple positioning results to generate the final positioning result of the unauthorized device 1 (step S57).

In the step S54 through the step S57, the movable locator 2 positions a specific unauthorized device (such as a first unauthorized device) based on multiple sensing report data 42 corresponding to the first unauthorized device from the sensing report record collection 43. After the step S57, the movable locator 2 determines whether data corresponding to another device ID are left unprocessed in the sensing report record collection 43 (step S58).

If no data corresponding to another device ID is left unprocessed in the sensing report record collection 43, the movable locator 2 terminates the detecting method of the present disclosure. If data corresponding to another device ID (such as a second unauthorized device) are left unprocessed in the sensing report record collection 43, the movable locator 2 re-executes the step S54 to the step S57 to position the second unauthorized device through the same technical solution introduced above.

In one embodiment, the movable locator 2 periodically organizes the multiple positioning combinations from the sensing report record collection 43 in the step S54 to position the unauthorized device 1. For example, the movable locator 2 may perform the organization action every second or every five seconds to generate the final positioning result of the unauthorized device 1.

In another embodiment, the movable locator 2 organizes the multiple positioning combinations from the sensing report record collection 43 when being triggered by an event(s), so as to position the unauthorized device 1. For example, the movable locator 2 may organize the multiple positioning combinations whenever one sensing report message 41 is newly generated and generate the final positioning result of the unauthorized device 1 for once.

In one embodiment, the movable locator 2 positions the unauthorized device 1 by using the triangulation-like positioning technology. To implement the technical solution, every positioning combination organized by the movable locator 2 in the step S54 includes at least three sensing report data 42. In the embodiment, every sensing report data 42 corresponds to same unauthorized device (i.e., has same device ID), and each positioning combination has multiple sensing report data 42 that are not overlapped.

It should be mentioned that the movable locator 2 of the present disclosure positions the unauthorized device 1 by using the signal information of the broadcast Wi-Fi signal of the sensing report data 42; however, a part of the positioning combinations may have worse positioning effect due to the locator position of the movable locator 2 when the broadcast Wi-Fi signal is sensed. That is, the movable locator 2 may first exclude one or more inappropriate positioning combinations from the multiple sensing report data 42 based on pre-determined positioning condition and then execute the positioning procedure in accordance with the multiple sensing report data 42 being left. Therefore, the accuracy of the final positioning result generated by the movable locator 2 may be improved.

Figure 7A:
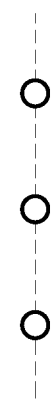
FIG. 7A schematic diagram of a pattern of inappropriate positioning of one embodiment according to the present disclosure.
Figure 7B:
FIG. 7B is a schematic diagram of a pattern of inappropriate positioning of one embodiment according to the present disclosure.
Figure 7C:
FIG. 7C is a schematic diagram of a pattern of inappropriate positioning of one embodiment according to the present disclosure.

Please refer to FIG. 7A, FIG. 7B, and FIG. 7C, wherein FIG. 7A, FIG. 7B, and FIG. 7C are different schematic diagrams of patterns of inappropriate positioning according to the present disclosure.

As discussed above, every sensing report data 42 includes the locator position of the movable locator 2 when the broadcast Wi-Fi signal is detected. As shown in FIG. 7A, one of the inappropriate combinations includes the locator positions in at least three sensing report data 42 are in a straight line. Because the at least three sensing report data 42 cannot form a valid triangular area, the positioning result calculated based on these three sensing report data 42 may be less accurate. As a result, the movable locator 2 regards the above data combination as one of the inappropriate combinations.

As shown in FIG. 7B, one of the inappropriate combinations includes at least two locator positions out of the at least three sensing report data 42 are overlapped. When two locator positions of the at least three sensing report data 42 are overlapped or nearly overlapped, a valid triangular area may not be formed, and the positioning result calculated based on these three sensing report data 42 may be less accurate. As a result, the movable locator 2 regards the above data combination as one of the inappropriate combinations.

As shown in FIG. 7C, one of the inappropriate combinations includes that a straight line formed by two locator positions out of the at least three sensing report data 42 is too close to another locator position of the at least three sensing report data 42. Although the at least three sensing report data 42 in the embodiment may still form a triangular area, but the range of this triangular area is close to a straight line so the positioning result calculated based on these three sensing report data 42 may be less accurate. As a result, the movable locator 2 regards the above data combination as one of the inappropriate positioning combinations.

However, the above descriptions are only few embodiments of the present disclosure, but the inappropriate positioning combinations of the present disclosure are not limited to the types disclosed above.

Figure 8:
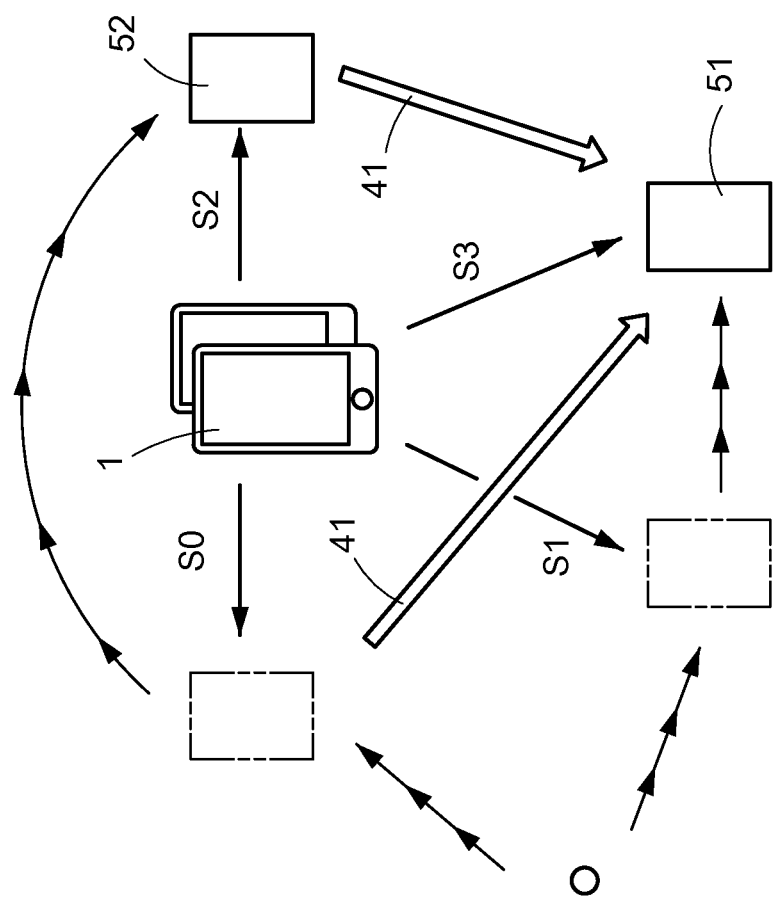
FIG. 8 a schematic diagram showing the movement of movable locators of one embodiment according to the present disclosure.

Please refer to FIG. 8, which is a schematic diagram showing the movement of movable locators of one embodiment according to the present disclosure. In one embodiment, the detecting system of the present disclosure has two or more than two movable locators, wherein the two or more than two movable locators at least include one master locator 51, and the rest of the movable locators are slave locators 52. For the sake of understanding, a combination of one master locator 51 and one slave locator 52 is taken as an example in FIG. 8. However, the amount of the slave locator 52 is not limited to one as depicted in FIG. 8.

To enlarge the detecting range and improve the detecting accuracy, the manager may pre-set different patrol routes. In the embodiment of FIG. 8, the master locator 51 moves from a starting point along a first patrol route and the slave locator 52 moves from same or different starting point along a second patrol route which is different from the first patrol route.

Like the movable locator 2 in the previous embodiment, the master locator 51 continuously generates the locator position of itself and continuously senses external signal. When the broadcast Wi-Fi signal (for example, the broadcast Wi-Fi signal S1 and S3 shown in FIG. 8) is sensed, the master locator 51 generates a sensing report message correspondingly. The explanation to the content of the sensing report message is same as or similar to the sensing report message 41 generated by the movable locator 2 in the above embodiment, detailed description is omitted here.

Like the master locator 51, the slave locator 52 continuously generates the locator position of itself and continuously senses external signal. When the broadcast Wi-Fi signal (for example, the broadcast Wi-Fi signal S0 and S2 as shown in FIG. 8) is sensed, the slave locator 2 generates the sensing report message correspondingly. The content of the sensing report message is same as or similar to the sensing report message 41 generated by the movable locator 2 in the above embodiment, detailed description is omitted here.

In the embodiment, only the master locator 51 positions the unauthorized device 1 while the slave locator 52 does not perform the positioning procedure. More specifically, the master locator 51 and the slave locator 52 respectively generate the sensing report message 41 when sensing the broadcast Wi-Fi signal of the unauthorized device 1, and the slave locator 52 transmits the sensing report message 41 to the master locator 51 through wireless network. On the other hand, the master locator 51 collects multiple sensing report messages 41 generated by itself and multiple sensing report messages 41 provided by the slave locator 52 to position the unauthorized device 1.

Figure 9:
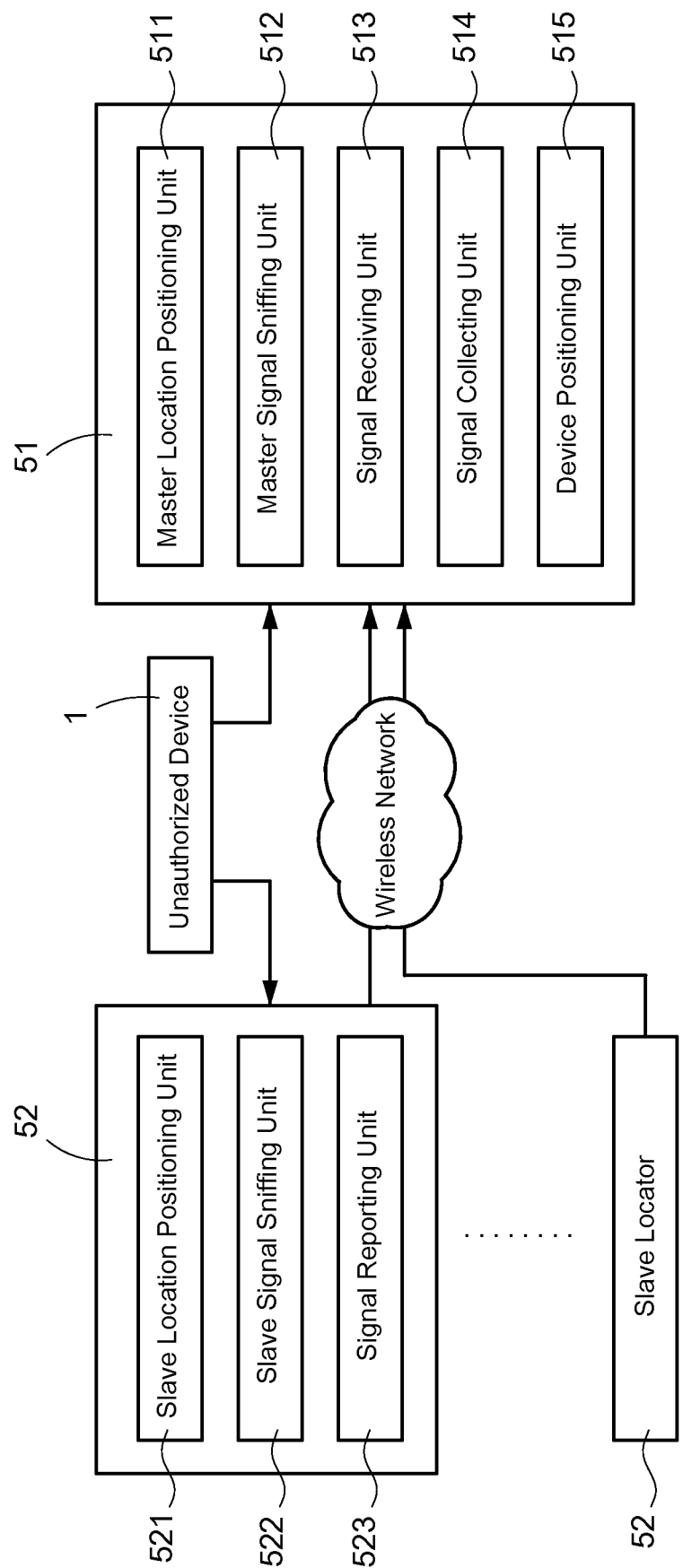
FIG. 9 is a block diagram of movable locators of one embodiment according to the present disclosure.

Please refer to FIG. 8 and FIG. 9 at the same time, wherein FIG. 9 is a block diagram of movable locators of one embodiment according to the present disclosure.

As disclosed in FIG. 9, the master locator 51 includes a master location positioning unit 511, a master signal sniffing unit 512, a signal receiving unit 513, a signal collecting unit 514, and a device positioning unit 515. The slave locator 52 includes a slave location positioning unit 521, a slave signal sniffing unit 522, and a signal reporting unit 523.

The master location positioning unit 511 and the slave location positioning unit 521 are same as or similar to the location positioning unit 21 in the above embodiments, and the master signal sniffing unit 512 and the slave signal sniffing unit 522 are same as or similar to the signal sniffing unit 22 in the above embodiments, detailed descriptions are omitted here.

The one or more slave locators 52 in the embodiment connect with the master locator 51 through the signal reporting unit 523 via wireless network. The signal reporting unit 523 may be, for example but not limited to, each type of wireless transmission modules (such as Wi-Fi module, Bluetooth module, or RF module). After sensing the broadcast Wi-Fi signal and generating the sensing report message 41 through the slave signal sniffing unit 522, the slave locator(s) 52 transmits the sensing report message 41 to the master locator 51 through the signal reporting unit 523.

The master locator 51 connects the slave locator(s) 52 through the signal receiving unit 513 via wireless network and receives the sensing report messages 41 transmitted from the slave locator(s) 52. The signal receiving unit 513 may be the wireless transmission module shares same standard with the signal reporting unit 523.

In the embodiment, the signal collecting unit 514 of the master locator 51 regards the sensing report message 41 generated by the master locator 51 (i.e., a first sensing report message) as well as the sensing report message 41 transmitted from the slave locator 52 (i.e., a second sensing report message) as the sensing report data 42 to add to same sensing report record collection 43. The content of the sensing report record collection 43 is depicted as FIG. 11. In the embodiment, the first sensing report message records the device ID of the unauthorized device 1 being sensed, the signal information of the broadcast Wi-Fi signal being sensed, and the master locator position of the master locator 51 when the broadcast Wi-Fi signal is sensed (exampled as ML0 in FIG. 11), and the second sensing report message records the device ID of the unauthorized device 1 being sensed, the signal information of the broadcast Wi-Fi signal being sensed, and the slave locator positions of the slave locator(s) 52 when the broadcast Wi-Fi signal is sensed (exampled as ML1 and ML2 in FIG. 11).

In the embodiment, the device positioning unit 515 of the master locator 51 is triggered periodically or triggered by events. When being triggered, the device positioning unit 515 retrieves multiple sensing report data 42 corresponding to a specific device ID from the sensing report record collection 43. Besides, the device positioning unit 515 organizes multiple positioning combinations from the multiple sensing report data 42 based on a positioning condition and execute the positioning procedure in accordance with the multiple positioning combinations to respectively generate multiple positioning results. Next, the device positioning unit 515 performs the weighting process to the multiple positioning results to generate a final positioning result of the unauthorized device 1.

The detecting system of the present disclosure uses the master locator 51 to position the unauthorized device 1 when the master locator 51 is triggered. If the amount of the unauthorized device 1 in the environment is plural, the sensing report record collection 43 of the master locator 51 may record multiple sensing report data 42 that are respectively corresponding to multiple device IDs. Therefore, when executing the positioning procedure by the device positioning unit 515, the master locator 51 processes the sensing report data 42 corresponding to different device IDs within same period or multiple consecutive periods, so as to respectively position the multiple unauthorized devices 1 in the environment.

Figure 10:
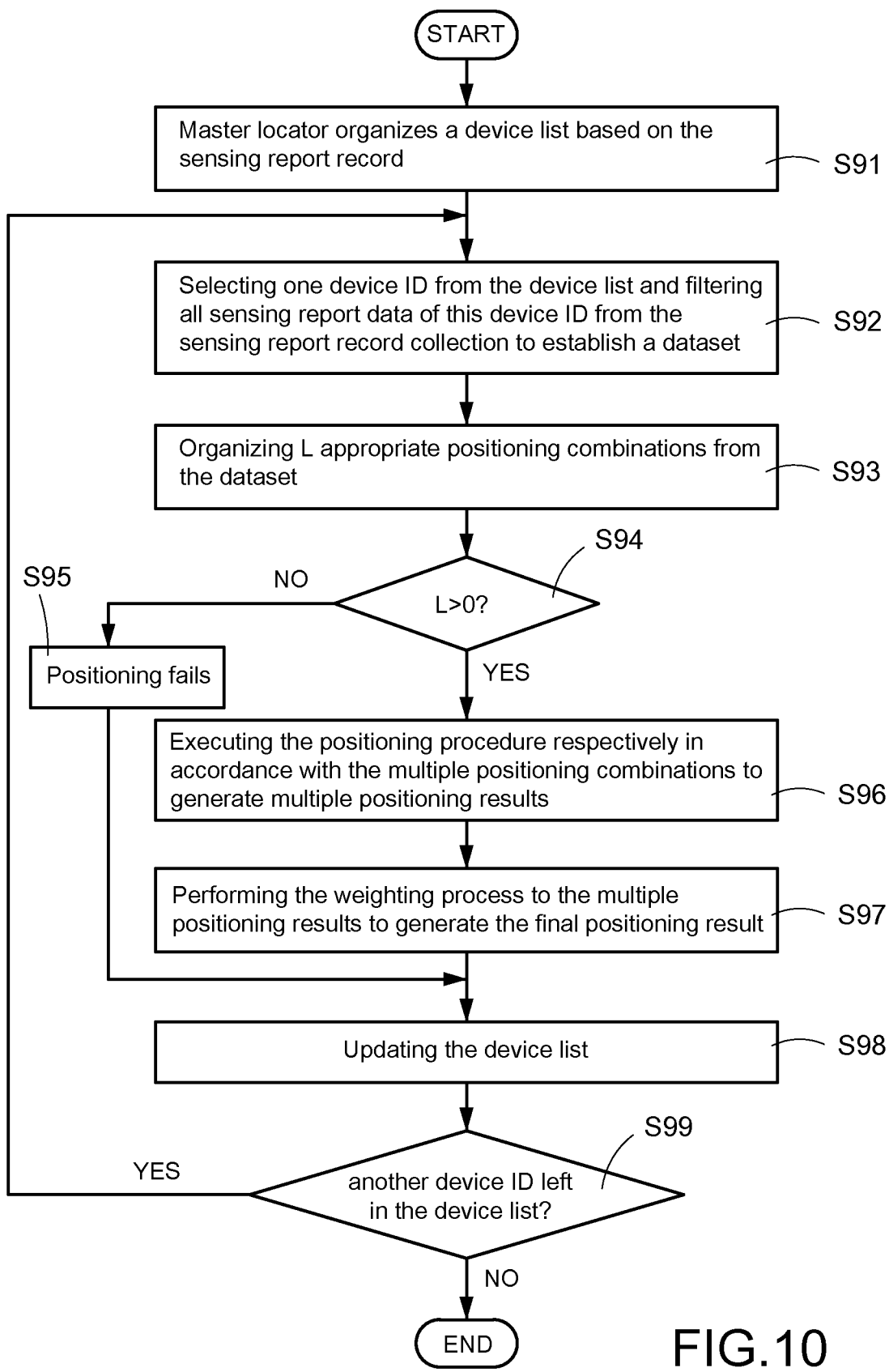
FIG. 10 is a flowchart of a detecting method of one embodiment according to the present disclosure.
Figure 11:
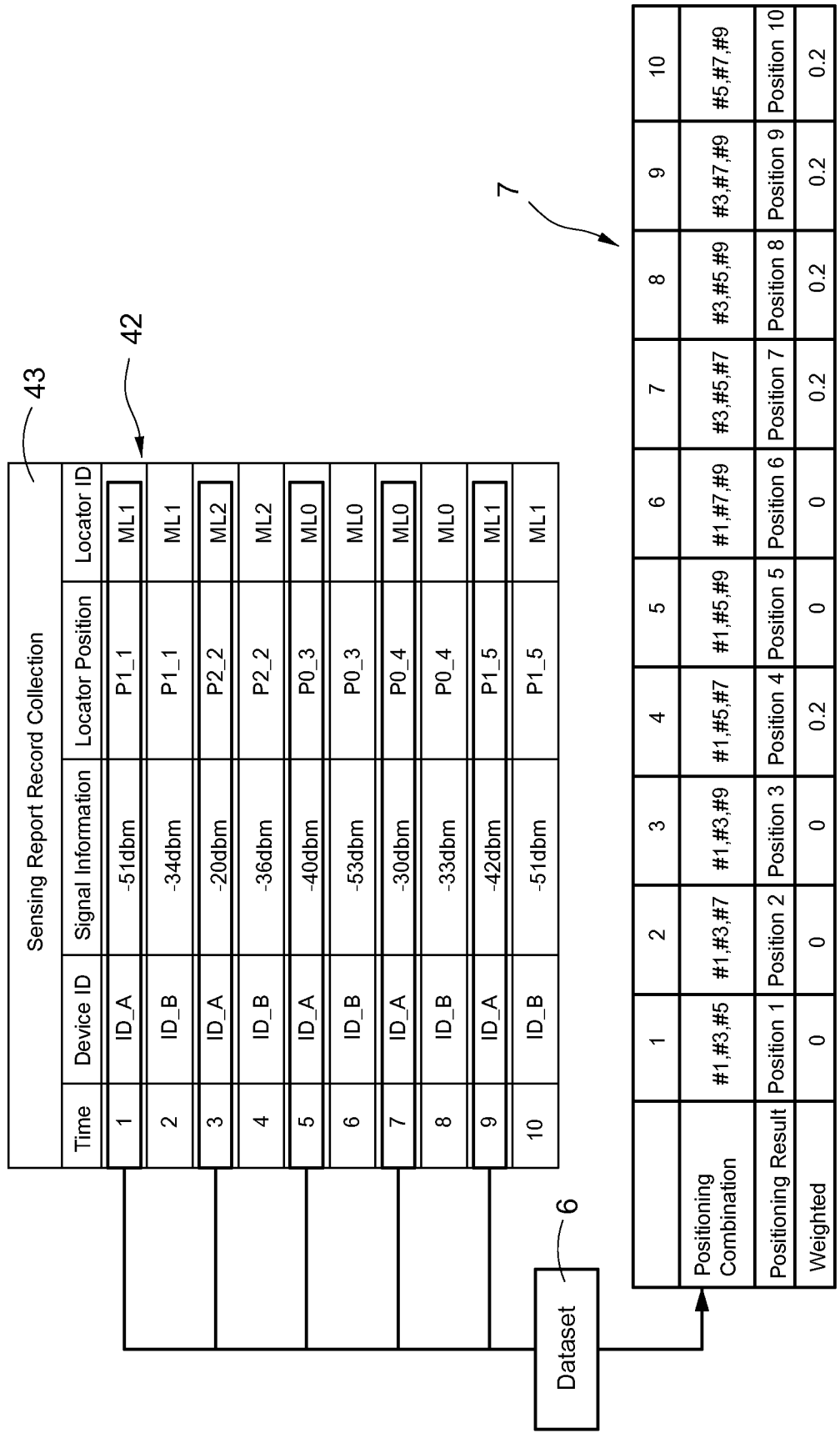
FIG. 11 is a schematic diagram of a sensing report record collection of one embodiment according to the present disclosure.

Please refer to FIG. 9, FIG. 10, and FIG. 11 at the same time, wherein FIG. 10 is a flowchart of a detecting method of one embodiment according to the present disclosure and FIG. 11 is a schematic diagram of a sensing report record collection of one embodiment according to the present disclosure.

As disclosed in FIG. 10, the master locator 51 of the present disclosure may organize a device list based on the content of the sensing report record collection 43 when the master locator 51 is triggered (step S91). In particular, the device list enumerates all device ID recorded in the sensing report record collection 43. In FIG. 11, a first device ID (ID_A) of a first unauthorize device and a second device ID (ID_B) of a second unauthorized device are taken as an example.

Next, the master locator 51 selects one of the multiple device IDs from the device list (such as the ID_A) and filters all sensing report data 42 of this device ID from the sensing report record collection 43 to establish a dataset 6 (step S92). Next, the master locator 51 organizes multiple positioning combinations 7 (L positioning combinations 7 for example) that are appropriate for positioning from the dataset 6 (step S93). More specific, the master locator 51 excludes one or more inappropriate positioning combinations and remains several appropriate positioning combinations 7 from the dataset 6 based on a pre-set positioning condition, wherein each of the positioning combinations 7 respectively includes at least three sensing report data 42.

In the embodiment of FIG. 11, the sensing report record collection 43 includes ten sensing report data 42, wherein the first, the third, the fifth, the seventh, and the ninth sensing report data 42 are corresponding to the first device ID (i.e., ID_A). The master locator 51 establishes the dataset 6 in accordance with the five sensing report data 42 and organizes ten positioning combinations 7 based on the five sensing report data 42 in the dataset 6.

After the step S93, the master locator 51 determines whether the amount of the positioning combinations 7 (i.e., L) is greater than zero (step S94). If the amount of the positioning combinations 7 is not greater than zero, it means that neither the master locator 51 nor the slave locators 52 has sensed the first unauthorized device with the first device ID or the amount of the sensing report data 42 in the sensing report record collection 43 is not enough. In this scenario, the master locator 51 determines that the positioning fails (step S95).

If determining that the amount of the positioning combinations 7 is greater than zero in the step S94, the master locator 51 respectively executes the positioning procedure in accordance with the multiple positioning combinations 7 to generate multiple positioning results (step S96). In the embodiment of FIG. 11, the positioning result of a first positioning combination is position 1, the positioning result of a second positioning combination is position 2, and so on.

After the step S96, the master locator 51 performs the weighting process to the multiple positioning results to generate the final positioning result of this unauthorized device 1 (i.e., the first unauthorize device) (step S97). After the positioning for the first unauthorized device is completed, the master locator 51 deletes the first device ID from the device list to update the device list (step S98).

After the step S98, the master locator 51 determines whether other device IDs are left in the updated device list (step S99). If no device ID is left in the device list, the master locator 51 terminates the detecting method for this time. If at least one device ID (for example, a second device ID) is left in the device list, the master locator 51 re-executes the step S92 to the step S98 based on the second device ID to position another unauthorized device (such as a second unauthorized device) in the environment.

The present disclosure uses one or more movable locators to patrol in the environment to detect unauthorized device(s) existing in the environment and position the detected unauthorized device(s) in real-time. Therefore, the information security of a specific environment may be ensured with a low cost, high mobility, and convenient solution.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A detecting system for an unauthorized device, comprising a movable locator, and the movable locator comprising:
    a location positioning unit configured to position the movable locator to obtain a locator position;
    a signal sniffing unit configured to generate a sensing report message when sensing a broadcast Wi-Fi signal sent from an unauthorized device, wherein the sensing report message comprises a device ID of the unauthorized device, a signal information of the broadcast Wi-Fi signal, and the locator position of the movable locator when the broadcast Wi-Fi signal is detected;
    a signal collecting unit configured to regard the sensing report message as a sensing report data to add to a sensing report record collection, wherein the sensing report data records the device ID, the signal information, and the locator position; and
    a device positioning unit configured to retrieve multiple of the sensing report data corresponding to the device ID from the sensing report record collection, organize multiple positioning combinations from the multiple sensing report data based on a positioning condition, execute a positioning procedure in accordance with the multiple positioning combinations to generate multiple positioning results, and perform a weighting process to the multiple positioning results to generate a final positioning result of the unauthorized device.

2. The detecting system of claim 1, wherein each of the positioning combinations respectively comprises at least three sensing report data.

3. The detecting system of claim 2, wherein the device positioning unit is configured to exclude one or more inappropriate positioning combinations from the multiple sensing report data based on the positioning condition, wherein the inappropriate positioning combinations comprise the locator positions in the at least three sensing report data are in a straight line, at least two of the locator positions out of the at least three sensing report data are overlapped, and a straight line formed by two locator positions out of the at least three sensing report data is too close to another locator position of the at least three sensing report data.

4. The detecting system of claim 1, wherein the location positioning unit is configured to position the movable locator based on an inertial positioning technology.

5. The detecting system in claim 1, further comprising a signal receiving unit configured to receive a slave sensing report message transmitted through wireless network from another movable locator, wherein the slave sensing report data records the device ID, the signal information, and the locator position of the another movable position, and the signal collecting unit is configured to regard the sensing report message and the slave sensing report message as the sensing report data to add to the sensing report record collection.

6. The detecting system of claim 1, wherein the device positioning unit is configured to periodically organize the multiple positioning combinations from the sensing report record collection or organize the multiple positioning combinations from the sensing report record collection when the sensing report message is newly generated by the signal sniffing unit.

7. The detecting system of claim 1, wherein the signal information is a signal strength or a channel state information of the broadcast Wi-Fi signal.

8. A detecting system for an unauthorized device, comprising:
    a master locator configured to move along a first patrol route and generate a first sensing report message when sensing a broadcast Wi-Fi signal of an unauthorized device, wherein the first sensing report message at least comprises a device ID of the unauthorized device, a signal information of the broadcast Wi-Fi signal, and a master locator position of the master locator when the broadcast Wi-Fi signal is detected; and
    a slave locator configured to move along a second patrol route which is different from the first patrol route, generate a second sensing report message when sensing the broadcast Wi-Fi signal of the unauthorized device, and wirelessly transmit the second report message to the master locator, wherein the second sensing report message at least comprises the device ID of the unauthorized device, the signal information of the broadcast Wi-Fi signal, and a slave locator position of the slave locator when the broadcast Wi-Fi signal is detected;
    wherein the master locator comprises:
    a signal collecting unit configured to regard multiple of the first sensing report message and multiple of the second sensing report message as multiple sensing report data to add to a sensing report record collection, wherein each of the sensing report data respectively records the device ID, the signal information, and the master locator position or the slave locator position; and
    a device positioning unit configured to retrieve the multiple sensing report data corresponding to the device ID from the sensing report record collection, organize multiple positioning combinations from the multiple sensing report data based on a positioning condition, execute a positioning procedure respectively in accordance with the multiple positioning combinations to generate multiple positioning results, and perform a weighting process to the multiple positioning results to generate a final positioning result of the unauthorized device.

9. The detecting system of claim 8, wherein each of the positioning combinations respectively comprises at least three sensing report data, and the device positioning unit is configured to exclude one or more inappropriate positioning combinations from the multiple sensing report data based on the positioning condition, wherein the inappropriate positioning combinations comprise the locator positions in the at least three sensing report data are in a straight line, at least two of the locator positions out of the at least three sensing report data are overlapped, and a straight line formed by two locator positions out of the at least three sensing report data is too close to another locator position of the at least three sensing report data.

10. The detecting system of claim 8, wherein the device positioning unit is configured to periodically organize the multiple positioning combinations from the sensing report record collection or organize the multiple positioning combinations when the sensing report message is newly generated.

11. The detecting system of claim 8, wherein the signal information is a signal strength or a channel state information of the broadcast Wi-Fi signal.

12. A detecting method for an unauthorized device, applied for the movable locator in claim 1, and comprising:
   a) moving along a patrol route by the movable locator to continuously obtain the locator position of the movable locator;
   b) generating the sensing report message by the movable locator when sensing the broadcast Wi-Fi signal of the unauthorized device, wherein the sensing report message at least comprises the device ID of the unauthorized device, the signal information of the broadcast Wi-Fi signal, and the locator position of the movable locator when the broadcast Wi-Fi signal is detected;
   c) regarding multiple of the sensing report message as multiple sensing report data by the movable locator to add to the sensing report record collection, wherein each of the sensing report data respectively records the device ID, the signal information, and the locator position;
   d) retrieving multiple sensing report data corresponding to the device ID from the sensing report record collection by the movable locator and organizing multiple positioning combinations from the multiple sensing report data based on the positioning condition by the movable locator;
   e) executing the positioning procedure by the movable locator to respectively generate multiple positioning results in accordance with the multiple positioning combinations; and
   f) performing the weight process to the multiple positioning results by the movable locator to generate the final positioning result of the unauthorized device.

13. The detecting method of claim 12, wherein each of the positioning combinations respectively comprises at least three sensing report data, and the step d) comprises excluding one or more inappropriate positioning combinations from the multiple sensing report data based on the positioning condition, wherein the inappropriate positioning combinations comprise the locator positions in the at least three sensing report data are in a straight line, at least two of the locator positions out of the at least three sensing report data are overlapped, and a straight line formed by two locator positions out of the at least three sensing report data is too close to another locator position of the at least three sensing report data.

14. The detecting method in claim 12, wherein the step d) comprises periodically organizing the multiple positioning combinations from the sensing report record collection by the movable locator or organizing the multiple locator combinations from the sensing report record collection when the sensing report message is newly generated.

* * * * *